United States Patent [19]
Conradsson

[11] Patent Number: 5,833,324
[45] Date of Patent: Nov. 10, 1998

[54] WHEEL AND METHOD FOR MANUFACTURING OF THE SAME

[75] Inventor: Åke Conradsson, Bredaryd, Sweden

[73] Assignee: Industriverktyg AB, Bredaryd, Sweden

[21] Appl. No.: 817,936

[22] PCT Filed: Oct. 31, 1995

[86] PCT No.: PCT/SE95/01285

§ 371 Date: Jul. 23, 1997

§ 102(e) Date: Jul. 23, 1997

[87] PCT Pub. No.: WO96/13394

PCT Pub. Date: May 9, 1996

[30] Foreign Application Priority Data

Oct. 31, 1994 [SE] Sweden .................................. 9403721

[51] Int. Cl.[6] .................................................. B60B 3/00
[52] U.S. Cl. ........................................... 301/5.1; 301/64.7
[58] Field of Search ................................. 301/64.2, 64.3, 301/64.7, 5.3, 1, 5.1; 29/894, 894.32, 894.36; 152/323, 393, 394; 180/8.1, 8.3

[56] References Cited

U.S. PATENT DOCUMENTS

| 1,865,432 | 7/1932 | Bossert | 152/394 X |
|---|---|---|---|
| 3,578,812 | 5/1971 | Taussig et al. | |
| 3,843,202 | 10/1974 | Lacerte | 301/64.7 |
| 3,894,776 | 7/1975 | Black | |
| 4,217,944 | 8/1980 | Pascal | 301/64.3 X |
| 4,818,034 | 4/1989 | Djerf | |
| 4,919,489 | 4/1990 | Kopsco | 301/5.1 X |
| 4,943,101 | 7/1990 | Chapman | 301/1 |
| 5,174,633 | 12/1992 | Kidd et al. | 301/64.7 |
| 5,551,763 | 9/1996 | Alsman | 301/64.7 |

FOREIGN PATENT DOCUMENTS

| 572125 | 9/1945 | United Kingdom | 152/300 |
|---|---|---|---|
| 2 091 651 | 8/1982 | United Kingdom | |

*Primary Examiner*—Russell D. Stormer
*Attorney, Agent, or Firm*—Young & Thompson

[57] ABSTRACT

A wheel, of which the peripheral part (18) has axially separated circular annular flange parts (40), which form running surfaces (42) on the wheel. The wheel is made of complementary wheel halves, where each wheel half (12) on its peripheral part (18) has a groove (30) extending completely around each wheel half. The grooves (30) on the wheel halves communicate with each other through openings, whereby the peripheral parts (18) of the wheel halves are held together by an elastic material (58) injected into the grooves and openings. A method for manufacturing such a wheel whereby the peripheral parts of the wheel halves are fixed together by injection of an elastic material in mutually communicating spaces (30) extending around the wheel halves. These spaces are located radially inside the peripheral surface parts (44) of the wheel.

20 Claims, 4 Drawing Sheets

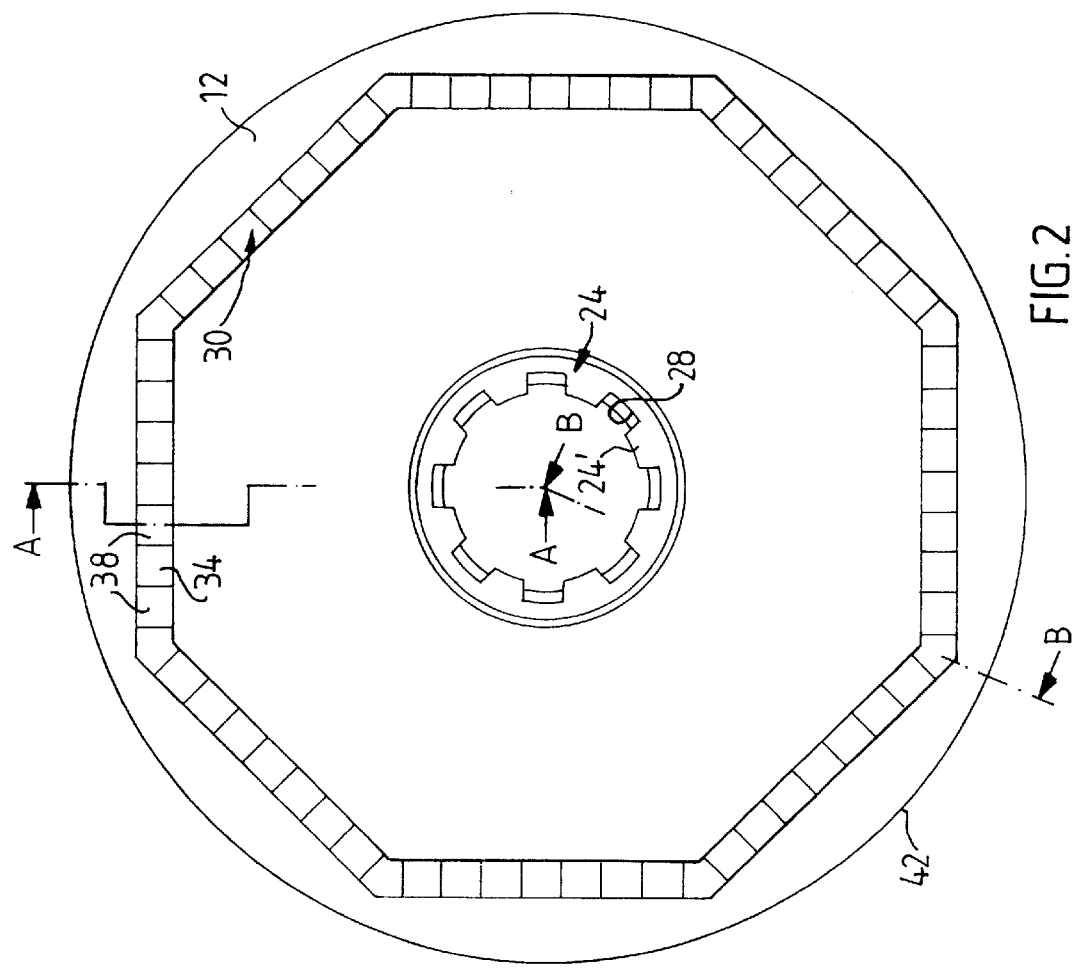
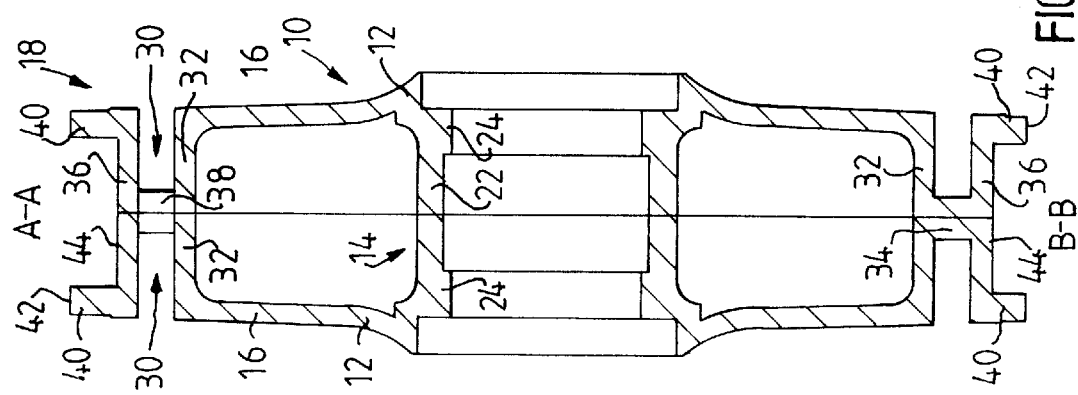

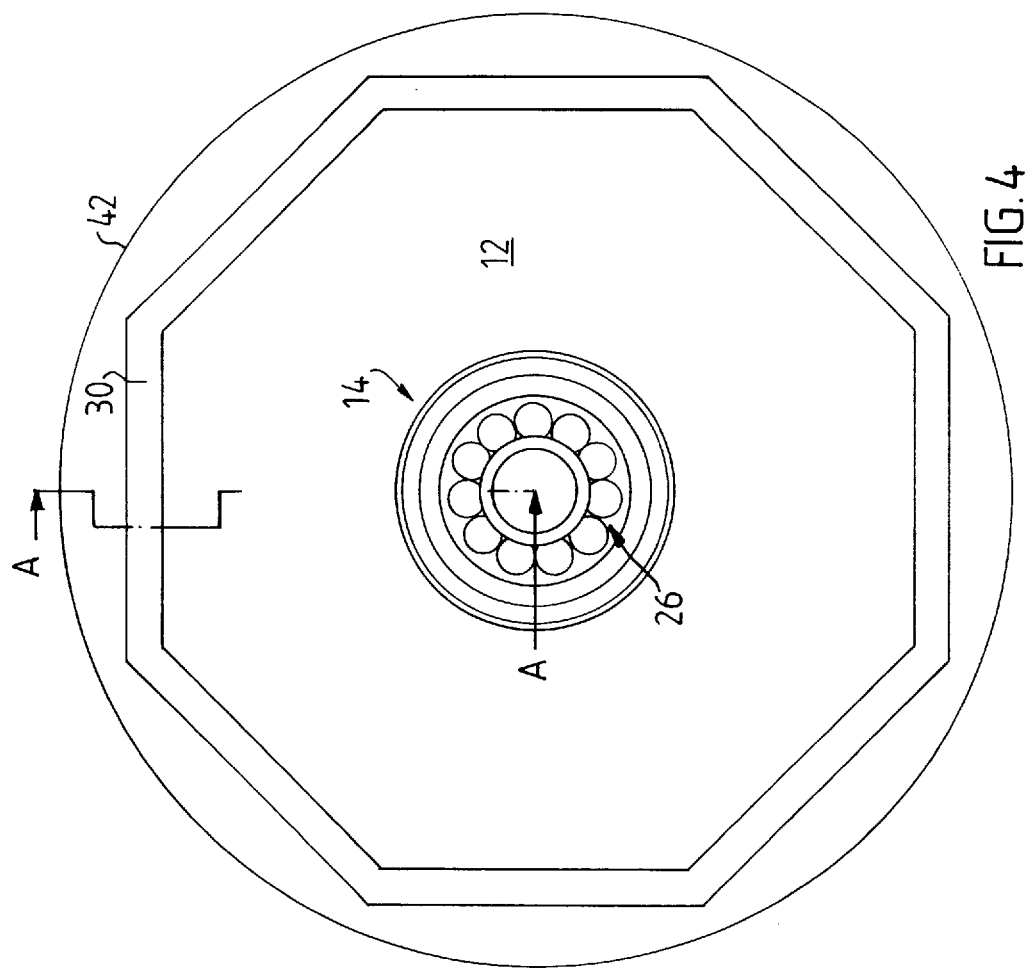
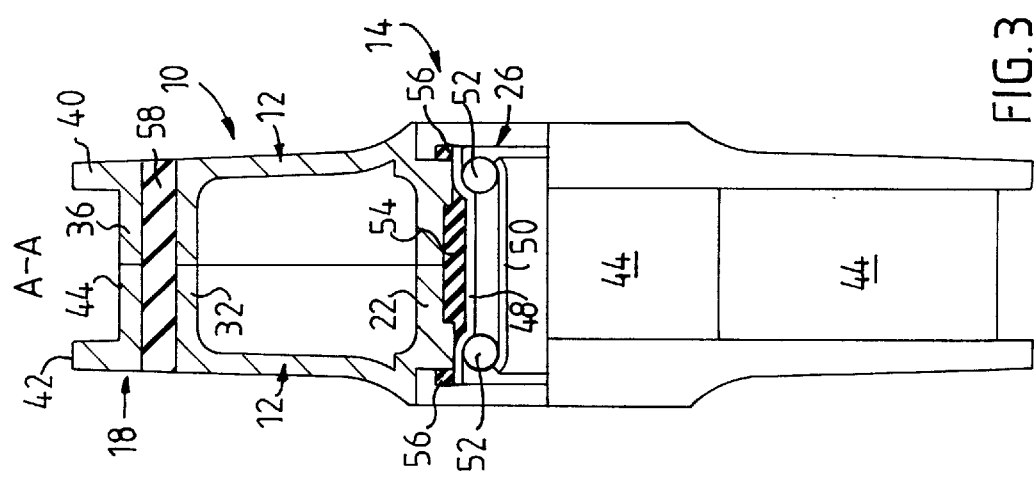

WHEEL AND METHOD FOR MANUFACTURING OF THE SAME

BACKGROUND OF THE INVENTION

The present invention concerns a wheel, especially a wheel for shopping trolleys or carts, such wheel comprising a wheel body, which has a hub part and a peripheral part, where the peripheral part has axially separated, circular annular flange parts, which form a running surface on the wheel body, and, lying between the annular flanges, a peripheral surface, which comprises surface portions in a polygonal configuration around the periphery of the wheel body.

DESCRIPTION OF THE PRIOR ART

Shopping trolley wheels of the above-mentioned type are known, in which the wheel can facilitate keeping the trolley stationary when it is being transported on an inclined escalator-type conveyor belt, by the running surfaces of the wheels being made of axially separated, circular peripheral angular flanges which can fall down into the longitudinal grooves on the bearing surface or the conveyor belt, so that one of the flat peripheral surfaces in the polygonal configuration lying between the annular flanges can rest in contact against the upper side of the conveyor belt and in this way make an undesirable rolling of the wheel more difficult. Such wheels have been made as solid, relatively heavy wheel bodies.

In order to achieve a relatively light wheel construction, it has earlier been suggested to make wheel bodies from two complementary, bowl-shaped wheel halves joined together in order to form a relatively hollow wheel body. The peripheral parts of the wheel halves in such a wheel body can in this way be held together and joined to each other through a tread being moulded around the outer periphery of the wheel body (cf., for example, SE-A-9402565-7). Such an enclosing moulding of a tread around the peripheral surface of the wheel halves is, however, not possible in a wheel of the type described in the introduction.

SUMMARY OF THE INVENTION

An object of the present invention is to achieve a wheel made of two wheel halves joined together, which has axially separated circular peripheral annular flanges and has a polygonal peripheral surface between the annular flanges, where the peripheral parts of the wheel halves are held together by an elastic ring which at the same time can be used as a noise and vibration damper to let the wheel roll quietly and comfortably.

This object is achieved by a wheel of the type described in the introduction by the wheel body being made up of complementary wheel halves, where each wheel half has near the peripheral part a groove extending completely around the wheel half and which, radially inside the peripheral planar surfaces, extends axially inwardly from the outside of the respective wheel half to an essentially radial, inner web part in the respective wheel half, said web part in the wheel halves having axial openings establishing communication between the grooves of the two wheel halves, the peripheral parts of the wheel halves being held together by an elastic material injected into the grooves and openings.

The invention also concerns a method for manufacturing such a wheel, in which the method is characterised in that the two complementary wheel halves are placed together and positioned in a mold, whereafter the peripheral parts of the two wheel halves are fixed to each other by injection of an elastic material in the mutually communicating space in the wheel halves, which goes all around, and lies radially inside, the peripheral planar surfaces of the wheel.

Preferably simultaneously with the fixing of the peripheral parts of the wheel halves, a fixing of the hub parts in the same takes place through an at least partially enclosing die cast moulding of a cylindrical bearing set in the hub part.

BRIEF DESCRIPTION OF THE DRAWINGS

Further details and characteristics of the invention will be made clear below with reference to the accompanying drawings, in which:

FIG. 1 is a cross-section through two complementary wheel halves placed together before fixing of the hub and peripheral parts of the wheel halves;

FIG. 2 is a side view of one of the wheel halves shown in FIG. 1;

FIG. 3 shows a partial sectioned view corresponding to FIG. 1 after fixing of the hub and peripheral parts of the wheel halves and a cylindrical bearing set in the hub part;

FIG. 4 is a side view of the wheel shown in FIG. 3;

DESCRIPTION OF THE PREFERRED EMBODIMENT

Figure 6:
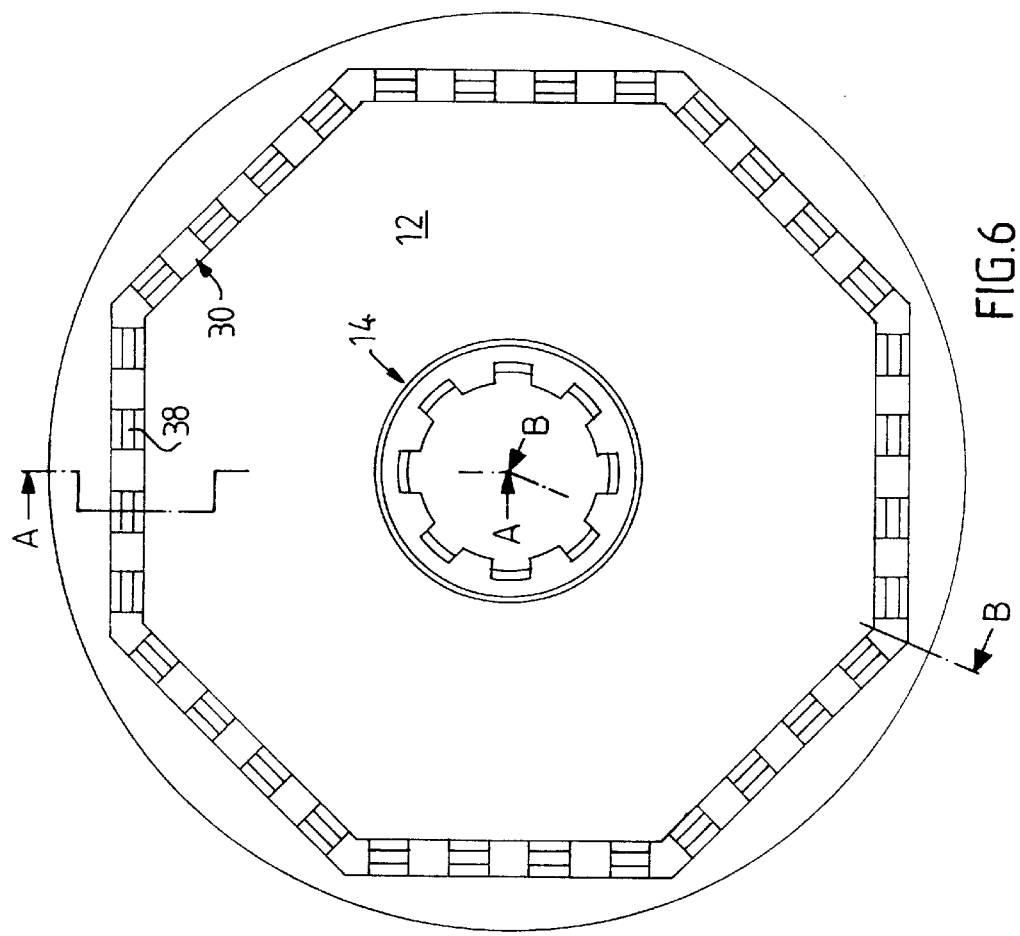
FIG. 6 is a side view of one of the wheel halves shown in FIG. 5.

FIG. 1 shows a cross-section of a first embodiment of a wheel 10 according to the present invention. The wheel 10 is comprised of two preferably identical, complementary wheel halves 12. Each wheel half 12 has an inner hub part 14, a disc-shaped radial part 16 and an outer peripheral part 18, and is made preferably from a curable plastic or another material which is shape-stable after moulding. Each hub part 14 has a cylindrical inner part 22 and an annular support element 24 for the radial support of an end of a cylindrical bearing 26 (FIG. 3). In the embodiment shown, the annular support element 24 assumes the form of a ring extending radially inward relative to the cylindrical part 22. This ring has a number of notches 28 distributed around the circumference, whereby a number of annularly arranged radial support bosses 24' for the cylindrical bearing 26 are formed.

The peripheral part 18 of each wheel half 12 has a groove 30 extending completely around the wheel half. The groove is delimited by a wall part 32 which goes inwardly axially from the disc part 16, a radial annularly shaped web part 34 and an outer axially orientated wall part 36. The web parts 34 of the wheel halves 12 abut against and support one another in the embodiment shown in FIG. 1 and have openings or holes 38 spaced around the circumference, which join the grooves 30 to each other.

An annular flange 40 with a circular peripheral surface 42 which forms a running surface on the finished wheel projects from the outer end of the respective outer axial wall part 36. The outer peripheral surface 44 of the wall part 36 lying between the annular flanges 40 forms a flat surface in a polygonal configuration around the periphery of the wheel.

In the embodiment shown, each such flat surface 44 forms one side of a hexagon. The annular flanges 40 are dimensioned in such a way that they, when for instance the wheels are used on a shopping trolley which is to be transported via an inclined conveyor belt of the escalator type between different floors in a building, can fall down in longitudinal grooves in the bearing surface of the conveyor belt, so that one of the flat peripheral surfaces 44 lying between the annular flanges 40 on each wheel can come to rest in flat contact with the upper side of the conveyor belt, thus making rolling of the wheel on the belt more difficult.

In FIGS. 3 and 4, a complete wheel is shown manufactured from the wheel halves 12 which are shown and described in connection with FIGS. 1 and 2. In addition to the wheel halves 12, the complete wheel comprises a cylindrically shaped bearing 26, which has an outer, elongated cylindrical bearing sleeve 48 and an inner cylindrical bearing sleeve 50. Ball-shaped bearing bodies 52 are contained in a respective bearing race at each end of the cylindrical bearing. The cylindrical bearing 46 is axially fixed in the hub part 14 of the wheel by means of an enclosing filling 54 of elastic material in a space outside the outer bearing sleeve 48 and between the support rings 24 and also by means of a ring 56 axially formed outside the support rings 24, which is continuously united with the filling 54. Apart from fixing the cylindrical bearing 46 in the hub part 14, the filling 54 and rings 56 bring about a locking together of the two wheel halves 12 in the central part of the wheel 10.

The peripheral part 18 of the wheel halves 12 are held together by a filling 58 of elastic material similar to that cast in the grooves 30 and in the holes 38 connected to these. In accordance with the present invention, the grooves 30 are formed in such a way that not only do they form via holes 38 a continuous space for a filling 58 to join together the peripheral part 18 of the wheel halves 12, but they also, at the same time, form a suitable space in which the filling 58 made of elastic material can form a suitable damping element, which damps vibration and noise which can occur, when the wheel is running, at the running flanges 40 of the wheel and the peripheral wall part 36 therebetween. An elastic plastic material, for example an elastomer, such as poly-urethane rubber or similar material, can suitably be used for fixing of the peripheral part 18 of the wheel halves 12 and for damping of vibration and noise.

The locking together of hub and peripheral parts 14 and 18, respectively, of the wheel halves 12 as well as fixing of the cylindrical bearing 26 in the hub part and forming of the damping element 58 is most advantageously achieved in the same sub-operation and using the same elastic material, even it is also conceivable to perform the moulding of the elastic material in different materials and at different times.

Figure 5:
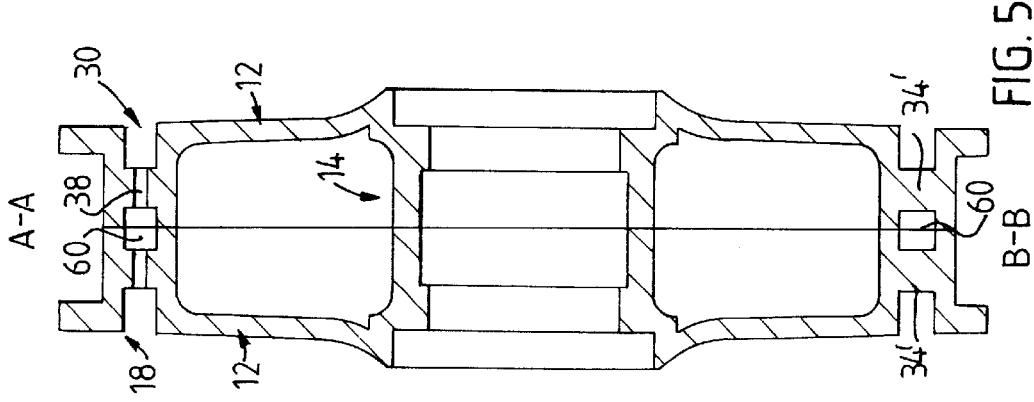
FIG. 5 shows an alternative embodiment of the wheel in a view corresponding to FIG. 1.

FIGS. 5 and 6 show an alternative embodiment of the grooves 30 on the peripheral part 18 of the wheel halves 12, where the radial web parts 34' are held somewhat axially separated from one another to form a third intermediate space 60 for the damping of vibrations and noise. Otherwise this embodiment corresponds to that shown in FIGS. 1 and 2.

Figure 8:
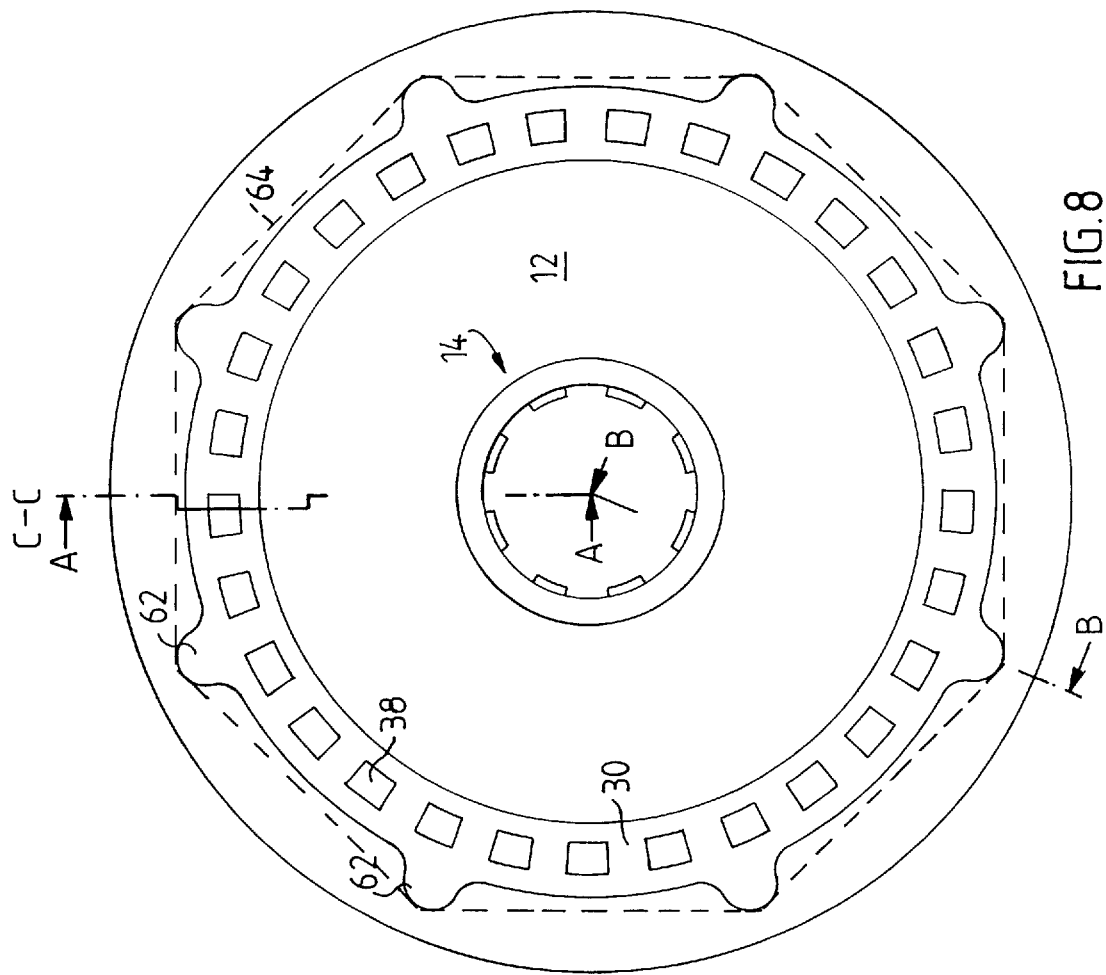
FIG. 8 is a side view of one of the wheel halves shown in FIG. 7.
Figure 7:
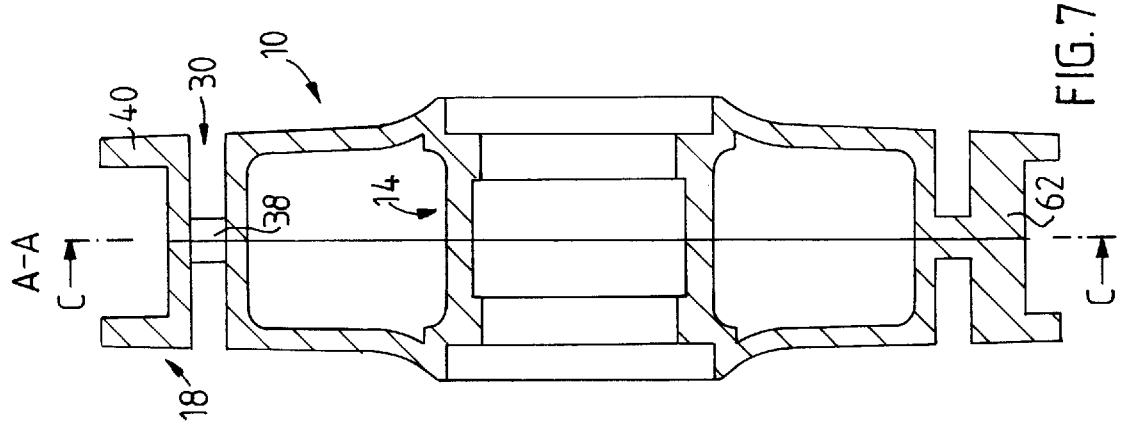
FIG. 7 shows a further embodiment of the wheel in a view corresponding to FIG. 1.

FIGS. 7 and 8 show a further embodiment of a wheel according to the present invention, in which the flat peripheral surfaces 44 in FIGS. 1–6 are replaced by functionally equivalent radially outwardly directed support elements 62, placed at the corners of an octagon 64. During transport on an inclined escalator-type conveyor belt, the wheel can in this way be kept stationary on the underlying surfaces by two adjacent support elements 62. As shown in FIG. 8, the annular formation 30 has further a circular annular shape in contrast to the octagonal shape in FIGS. 1–6.

It is of course possible to vary the number of flat surfaces or projections at the corners in the polygonal configuration. This number ranges preferably from between five and ten.

I claim:

1. A wheel comprising:
   a wheel body, said wheel body comprising a hub part (14) and a peripheral part (18);
   said peripheral part comprising axially separated circular annular flange parts (40) forming running surfaces (42) on said wheel body, and a peripheral surface lying between said annular flanges (40) which comprises surface portions (44, 62) in a polygonal configuration around the periphery of said wheel body within a circumference defined by said running surfaces;
   said wheel body further comprising complementary wheel halves;
   each said wheel half near said peripheral part (18) comprises a groove (30) extending completely around the wheel half and an essentially radial, inner web part (34, 34') located radially inside said surface portions (44, 62) and extending axially inwardly from the outside of each said wheel half; and
   said inner web parts of said wheel halves comprising axial openings (38) establishing communication between said grooves so that said peripheral parts of said wheel halves may be held together by an elastic material injected into said grooves and openings.

2. Wheel according to claim 1, wherein the hub parts (14) of the wheel halves (12) further comprise a cylindrically shaped bearing and are held together by said elastic material (54, 56) which is molded to at least partially enclose said cylindrically shaped bearing (46).

3. Wheel according to claim 1, wherein the elastic material (54, 56, 58) is an elastomer.

4. Wheel according to claim 1, wherein said inner web parts (34) of the wheel halves (12) abut each other substantially along a radial central plane of the wheel body.

5. Wheel according to claim 1, wherein the peripheral surface portions consist of flat surfaces (44) in a polygonal configuration.

6. Wheel according to claim 1, wherein the peripheral surface portions further comprise radially projecting support elements (62) placed at the corners of a polygon drawn between said radially Projecting support elements.

7. Wheel according to claim 1, wherein the number of peripheral surface portions in the polygonal configuration are five to ten.

8. Method for manufacturing a wheel (10) from two wheel bodies forming complementary wheel halves to comprise a wheel body, which has a hub part (14) and a peripheral part (18), where the peripheral part (18) has axially separated, circular annular flange parts (14), which form running surfaces (42) on the wheel body, and a peripheral surface, lying between the annular flanges, which comprises planar surfaces (44, 62) in a polygonal configuration around the periphery of the wheel body and within said running surfaces, comprising the steps of:
   said two wheel bodies forming complementary wheel halves (12) being joined together and placed in a mold; and fixing said peripheral parts (18) of the wheel halves (12) to each other by injection of an elastic material (58) in mutually communicating spaces (30, 60) extending completely around the wheel halves (12) and lying radially inside the peripheral planar surfaces (44, 62).

9. Method according to claim 8, wherein simultaneously with the fixing together of the peripheral parts (18) of the wheel halves (12), the hub parts (14) of the wheel halves are fixed together by a molding which at least partially encloses a cylindrically shaped bearing (46) set in the hub part (14).

10. Method according to claim 9, wherein the fixing together of the peripheral parts (18) of the wheel halves and the hub parts (14) is done using the same material.

11. Method according to claim 10, wherein the elastic material is an elastomer.

12. A wheel comprising:

a wheel body, said wheel body comprising a hub part (14) and a peripheral part (18);

said peripheral part comprising axially separated circular annular flange parts (40) forming running surfaces (42) on said wheel body, and a peripheral surface lying between said annular flanges (40) which comprises surface portions (44, 62) in a polygonal configuration around the periphery of said wheel body within a circumference defined by said running surfaces;

said wheel body further comprising complementary wheel halves;

each said wheel half near said peripheral part (18) comprises a groove (30) extending completely around the wheel half and an essentially radial, inner web part (34, 34') located radially inside said surface portions (44, 62) and extending axially inwardly from the outside of each said wheel half;

said inner web parts of said wheel halves comprising axial openings (38) establishing communication between said grooves so that said peripheral parts of said wheel halves may be held together by an elastic material injected into said grooves and openings; and said hub part of each wheel half further comprises a cylindrically shaped bearing, wherein said hub parts may be held together by said elastic material molded to at least partially enclose said cylindrically shaped bearing.

13. Wheel according to claim 12, wherein said inner web parts (34) of the wheel halves (12) abut each other substantially along a radial central plane of the wheel body.

14. Wheel according to claim 12, wherein the peripheral surface portions consist of flat surfaces (44) in a polygonal configuration.

15. Wheel according to claim 12, wherein the peripheral surface portions further comprise radially projecting support elements (62) placed at the corners of a polygon drawn between said radially projecting support elements.

16. Wheel according to claim 12, wherein the number of peripheral surface portions in the polygonal configuration are five to ten.

17. Wheel according to claim 12, wherein the elastic material is an elastomer.

18. Method for manufacturing a wheel (10) from two wheel bodies forming complementary wheel halves to comprise a wheel body, which has a hub part (14) and a peripheral part (18), where the peripheral part (18) has axially separated, circular annular flange parts (14), which form running surfaces (42) on the wheel body, and a peripheral surface, lying between the annular flanges, which comprises planar surfaces (44, 62) in a polygonal configuration around the periphery of the wheel body and within said running surfaces, comprising the steps of:

(i) said two wheel bodies forming complementary wheel halves (12) being joined together and placed in a mold;

(ii) fixing said peripheral parts (18) of the wheel halves (12) to each other by injection of an elastic material (58) in mutually communicating spaces (30, 60) extending completely around the wheel halves (12) and lying radially inside the peripheral planar surfaces (44, 62); and (iii) simultaneously with the fixing together of the peripheral parts (18) of the wheel halves (12), the hub parts (14) of the wheel halves are fixed together by a molding which at least partially encloses a cylindrically shaped bearing (46) set in the hub part (14).

19. Method according to claim 18, wherein the fixing together of the peripheral parts (18) of the wheel halves and the hub parts (14) is done using the same material.

20. Method according to claim 19, wherein the elastic material is an elastomer.

* * * * *